United States Patent
Sunay et al.

(10) Patent No.: US 10,523,749 B2
(45) Date of Patent: Dec. 31, 2019

(54) METHOD AND APPARATUS FOR VIRTUALIZED SCHEDULER

(71) Applicant: ARGELA-USA, INC., Sunnyvale, CA (US)

(72) Inventors: Mehmet Oguz Sunay, San Francisco, CA (US); Ulas Can Kozat, Mountain View, CA (US)

(73) Assignee: NETSIA, INC., Sunnyvale, CA (US)

( * ) Notice: Subject to any disclaimer, the term of this patent is extended or adjusted under 35 U.S.C. 154(b) by 241 days.

(21) Appl. No.: 15/178,548

(22) Filed: Jun. 9, 2016

(65) Prior Publication Data
US 2017/0019469 A1 Jan. 19, 2017

Related U.S. Application Data (60) Provisional application No. 62/192,034, filed on Jul. 13, 2015.

(51) Int. Cl.
| | | |
|---|---|---|
| *H04L 29/08* | (2006.01) | |
| *H04L 5/00* | (2006.01) | |
| *H04L 29/06* | (2006.01) | |

(52) U.S. Cl.
CPC ......... *H04L 67/1053* (2013.01); *H04L 5/006* (2013.01); *H04L 5/0044* (2013.01); *H04L 69/166* (2013.01); *H04L 69/324* (2013.01)

(58) Field of Classification Search
None
See application file for complete search history.

(56) References Cited

U.S. PATENT DOCUMENTS

| | | | |
|---|---|---|---|
| 8,351,948 B2 | 1/2013 | Kokku et al. | |
| 8,700,047 B2 | 4/2014 | Kokku et al. | |
| 8,873,482 B2 | 10/2014 | Kokku et al. | |
| 8,874,125 B2 | 10/2014 | Mahindra et al. | |
| 2003/0067903 A1* | 4/2003 | Jorgensen | H04L 1/20 370/338 |
| 2011/0029347 A1 | 2/2011 | Kozat et al. | |
| 2012/0002620 A1 | 1/2012 | Kokku et al. | |
| 2012/0044876 A1 | 2/2012 | Taaghol | |
| 2012/0290725 A1* | 11/2012 | Podila | G06F 9/5011 709/226 |
| 2013/0094486 A1 | 4/2013 | Bhanage et al. | |
| 2013/0294369 A1* | 11/2013 | Dinan | H04L 5/001 370/329 |

* cited by examiner

*Primary Examiner* — Hamza N Algibhah
*Assistant Examiner* — Tony Williams
(74) *Attorney, Agent, or Firm* — IP Authority, LLC; Ramraj Soundararajan (57) ABSTRACT

Disclosed within is a communication architecture for medium access control (MAC) layer virtualization, where the architecture is made up of: a physical MAC layer, a plurality of physical resource blocks (RBs) associated with the MAC layer, a plurality of virtual medium access control (vMAC) layers, where each vMAC layer corresponds to a separate service group, with each service group programming its own scheduling logic in each vMAC layer, and a plurality of virtual resource blocks (vRBs) associated with each vMAC layer, where the vRBs are filled with data packets according to the scheduling logic in each vMAC instance. The physical MAC layer virtualizes the RBs as vRBs and assigns them to each vMAC layer according to a service level agreement associated with each service group, and each vMAC maps traffic flows of subscribers associated with it onto the assigned vRBs.

17 Claims, 5 Drawing Sheets

METHOD AND APPARATUS FOR VIRTUALIZED SCHEDULER

RELATED APPLICATIONS

This application claims benefit of U.S. provisional application Ser. No. 62/192,034 filed Jul. 13, 2015.

BACKGROUND OF THE INVENTION

Field of Invention

The present application pertains to the medium access control operations for the radio access networks of wireless broadband communication systems, and more particularly to methods and apparatus for virtualizing such operations.

Discussion of Related Art

US 20110029347 A1 presents a wireless network virtualization scheme, where each mobile virtual network operator (MVNO) bids for resource blocks by providing a per-user rate-utility function to the network operator. Physical network operator (PNO) in return makes rate allocation to each MVNO, set current and future prices for the resource blocks, based on sum-utility maximization across all users. MVNOs transfer the bytes for each user based on the allocation and update utility functions of each user.

US 20130094486 A1 discloses a virtualization scheme for wireless local area networks, where multiple virtual access points sharing the same physical access point are granted time shares to access the resources of the physical access point for transmitting the data packets of users associated with the said virtual access points over the wireless medium.

US 20120044876 A1 discloses a virtualized base station belonging to an operator A and a mobile subscriber of another operator B can access to its home network (i.e., B) after a virtual base station that is part of operator B is instantiated on the virtualized base station that belongs to operator A.

U.S. Pat. No. 8,873,482 B2 discloses a wireless network virtualization substrate at the scheduling layer, where each MVNO requests bandwidth and/or slot reservations (where slot refers to time, frequency, spreading code, etc., resources specifying the unit of resource block) from the virtualization substrate. The virtualization substrate first picks an MVNO to schedule over a slot (e.g., after sorting each MVNO with respect to the ratio of bandwidth/resource allocated and bandwidth/resource reserved). Invention also includes utility maximization based allocation strategies in deciding which MVNO should be assigned to what slot. Then, the virtualization substrate schedules the flows of the selected MVNO on the allocated slots. Each MVNO can control the ordering of flows and packets by specifying the scheduling policy for its own flows, putting virtual time tags in the packet headers, or any other means that do not impede the line speed processing.

U.S. Pat. No. 8,351,948 B2 and U.S. Pat. No. 8,700,047 B2 both disclose a customizable flow management in a cellular base station, where a plurality of custom flow management schedulers coexists on the same base station. Each flow management scheduler executes a flow management function, which can be configured and programmed by an external entity to change the flow selection process in each scheduler.

US 20120002620 A1 discloses a method for remotely virtualizing the flows from an entity external to the base station without modifying the base station itself. Virtualization entity shapes the traffic flows and schedules them before forwarding them to the base station entity. A synchronizing function on the external entity prevents packets being backlogged at the base station by matching the shaped traffic rate to the base station's transmission rate.

U.S. Pat. No. 8,874,125 B2 discloses a method where a plurality of individually virtualized base stations in a radio access network is shared across MVNOs. At an aggregator/gateway node, resources are allocated centrally to each MVNO on all base stations connected to the said aggregator node. Aggregator/gateway node dynamically compute optimal resource share of each MVNO on each base station based on revenue maximization. The computed shares are passed onto the scheduler at each base station, where the resource shares of MVNOs are locally enforced.

Embodiments of the present invention are an improvement over prior art systems and methods.

SUMMARY OF THE INVENTION

The present invention considers a wireless network where users or flows of users sharing a common spectrum are grouped together so that each group may be subjected to its own set of medium access control (MAC) protocols. The network operator or service provider that serves a plurality of subscribers defines a service group for the said plurality of subscribers and controls the corresponding virtualized MAC for the said service group. The grouping of the users or flows of users may be in one or more of the following ways:

In an environment where one physical network operator (PNO) and one or more mobile virtual network operators (MVNOs) utilize the same spectrum, users may be grouped according to their mobile virtual network operator subscriptions, Users may be grouped according to their service subscription profiles, Users may be grouped according to their geography and time specific radio resource reservation requests, Flows of users may be grouped according to flow profiles where a flow profile includes but is not limited to the following: flow type, flow header contents, over-the-top service provider identity.

The virtual medium access control layers for all existing groups are deployed on top of the physical mobile operator's medium access control layer. One or more virtual medium access control layers may be programmatically invoked, modified or terminated at a given time.

Unlike the prior art, the present invention provides the same semantics to each network operator or service provider controlling one or more service groups as if they were the PNO to conduct scheduling. Each service group is provided a set of virtual Resource Blocks (vRB) and virtual Channel State Information (vCSI) per service group subscriber for each resource block. Underlying mapping to the actual resource blocks allocated by the PNO based on the actual CSI information of all subscribers being served is hidden from the network operator controlling the service group. Each network operator or service provider controlling a service group implements its own virtual Medium Access Control (vMAC) for that group independent of the other vMACs present in the network for other service groups. A network operator or service provider may invoke multiple vMACs, a distinct one for each service group it controls. The implementations of the vMACs are based on the vRBs and vCSI provided by the PNO. The vRB and vCSI are virtual in the true sense that they may or may not have the same physical constraints RB and CSI would naturally have. For instance, the number of vRBs assigned to one or all service groups can be larger than the number of available RBs available for the underlying radio access technology (RAT). As another example, vCSI values can be a general function of CSI that amplifies or attenuates the per user CSI values to improve overall system efficiency.

The prior art on base station virtualization mainly focuses on base station sharing amongst multiple network operators. As such, two main flavors exist in the literature: (i) Full virtualization of the base station, where virtual base stations coexist side by side implementing the full protocol stack, but sharing the CPU, storage, network and radio spectrum in isolation. This method allows sharing of the radio access network, base station sites, antennas, backhaul, etc., but resource partitioning is fixed. (ii) Partial virtualization of the base station, where one PNO executes physical layer and MAC layer (L1/L2) processing, while MVNOs set flow/packet priorities of their subscribers. In partial virtualization of the base station, PNO can also provide isolated programmable L1/L2 frameworks that are configured and programmed by MVNOs. For instance, distinct MVNOs can program different scheduling policies based on the local states.

Full virtualization is a costly proposal and suitable mainly for large mobile operators to share the costs of managing and maintaining the network infrastructure. It allows for different radio access technologies run over the same network. It is inherently inefficient as radio spectrum resources are partitioned statically among the virtual base stations. The present invention does not statically partition the radio spectrum and takes full advantage of the available radio resources.

In partial virtualization, spectrum is aggregated, dynamically allocated among service groups, and thus more efficiently used. Network operators have direct visibility and control over queue dynamics of their service groups. Thus, they can differentiate their services by changing flow/packet priorities on the fly for each of service groups they control, based on the local states at the base station. For each service group, customized scheduling policies may be pushed to the PNO to handle service differentiation and fairness among the subscribers of the same service group. In the present invention, a given service group is dynamically allocated a number of vRBs for a given duration of time that is equal to one or more scheduling intervals. This way, the network operators or service providers controlling one or more service groups know a priori how many virtual resource blocks are allocated to them. This allows a better prioritization of the flows within each service group by the network operator or service provider that owns the said service group. The number of allocated vRBs is referred to as leased vRBs and the time duration of the said allocation is referred to as lease term. The leased vRBs and the lease term are determined directly as part of a service level agreement (SLA) between the network operator or service provider who owns the said service group and the PNO. During the lease term, the service group is served using a number of vRBs that is less than or equal to the leased vRBs. If the service group does not utilize all leased vRBs in any scheduling interval due to lack of demand, it incurs no penalty on the PNO side as vRBs are not tied to physical RBs until they are utilized. If the PNO falls short of mapping leased vRBs by a network operator or service provider onto the RBs in any scheduling interval, PNO may have to reimburse the said network operator or service provider based on the SLA. The reimbursement may be in the form of monetary payback to the network operator or service provider who owns the said service group. Alternatively, the reimbursement may also be in the form of an extra credit of vRBs to the network operator or service provider whose SLA were violated for future use.

The present invention can be viewed in the category of partial virtualization and has all the advantages of dynamic spectrum allocation. Unlike prior art on partial virtualization however we fully virtualize the MAC layer. In the present invention, each network operator or service provider controlling one or more service groups are given the capability to conduct resource block allocation decisions for their subscribers rather than only setting flow/packet priorities or configuring scheduling policies used by the PNO. Furthermore, for each network operator or service provider, these decisions may be different for each service group they control. The invention disclosed herein has a number of benefits. In an environment where there is one PNO and one of more MVNOs sharing spectrum resources, the invention simplifies the PNO design significantly as PNOs are now agnostic to the scheduling objectives of MVNOs. The invention also provides an added security to protect the business objectives and know-how of MVNOs from the PNO in their service offerings. MVNOs simply lease virtual resource blocks from the PNO with well-defined transport block sizes based on the modulation and coding scheme being utilized. Similar to the other partial virtualization methods it has access to queue states of their subscribers. Moreover, in virtual MAC, MVNOs have access to the CSI (or a function of CSI) and can make channel-aware resource block allocation decisions. The invention also allows for one network operator to form a number of service groups from its own subscribers using one of more different user or flow attributes and subject each group to potentially a different vMAC over a given number of vRBs, resulting in new business opportunities for the said network operator.

In one embodiment, the present invention provides a communication architecture for medium access control (MAC) layer virtualization comprising: (a) a physical MAC layer, (b) a plurality of physical resource blocks (RBs) associated with the MAC layer, (c) a plurality of virtual medium access control (vMAC) layers, each vMAC layer corresponding to a separate service group, where each service group programs its own scheduling logic in each vMAC layer, and (d) a plurality of virtual resource blocks (vRBs) associated with each vMAC layer, the vRBs filled with data packets according to the scheduling logic in each vMAC instance. The physical MAC layer virtualizes the RBs as vRBs and assigns them to each vMAC layer according to a service level agreement associated with each service group, and each vMAC maps traffic flows of subscribers associated with it onto the assigned vRBs.

In another embodiment, the present invention provides an article of manufacture comprising non-transitory computer storage medium storing computer readable program code which, when executed by a computer, implements medium access control (MAC) layer virtualization comprising: computer readable program code implementing a MAC layer, computer readable program code implementing a physical MAC layer, computer readable program code implementing a plurality of physical resource blocks (RBs) associated with the MAC layer, computer readable program code implementing a plurality of virtual medium access control (vMAC) layers, each vMAC layer corresponding to a separate service group, where each service group programs its own scheduling logic in each vMAC layer, computer readable program code implementing a plurality of virtual resource blocks (vRBs) associated with each vMAC layer, the vRBs filled with data packets according to the scheduling logic in each vMAC instance, wherein the physical MAC layer virtualizes the RBs as vRBs and assigns them to each vMAC layer according to a service level agreement associated with each service group, and each vMAC maps traffic flows of subscribers associated with it onto the assigned vRBs.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 4 illustrates an example of control plane and data/user plane split in the virtual MAC and physical MAC layers as well as the interfaces in between.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

Figure 1:
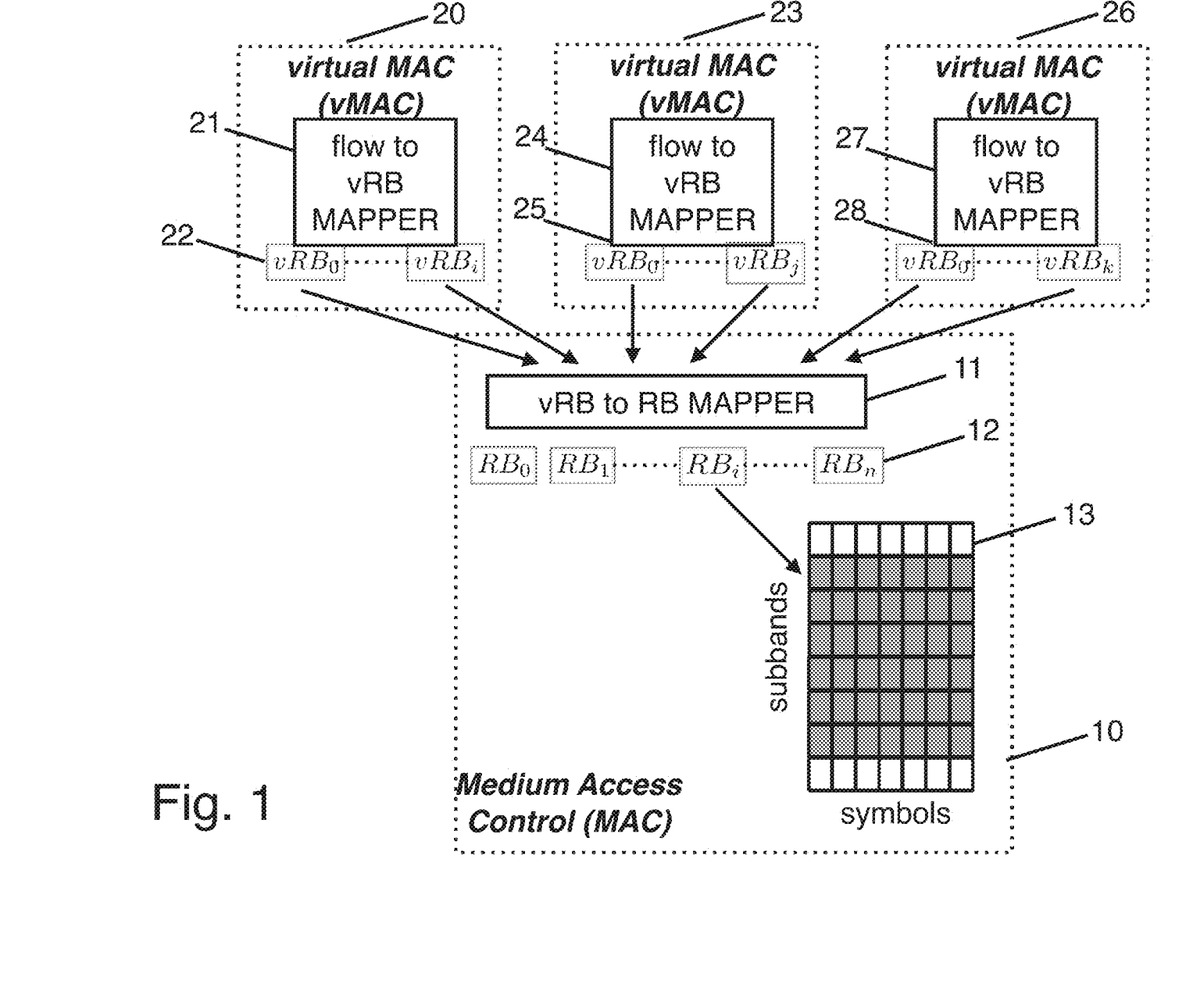
FIG. 1 depicts the overall virtualization architect of the invention.

FIG. 1 depicts the overall virtualization architecture of the invention. PNO provides the Medium Access Control layer (10 in FIG. 1) and has full control over which resource block (12) maps to the wireless channels (13). In FIG. 1, wireless channels are two-dimensional resources with orthogonal time slots and frequency sub-bands as in the case of LTE systems. It suffices to say that the invention covers any other channelization strategies (orthogonal or non-orthogonal channels) without loss of generality. MAC (10) has a fixed number of resource blocks. Unlike traditional systems, where MAC layer assigns resource blocks directly to wireless user equipment (UE), MAC layer in this invention assigns resource blocks to virtual Resource Blocks (vRBs) to actual resource blocks. Block 11 in FIG. 1 depicts this stage, i.e., vRB to RB Mapper. The mapping logic and strategy depends on the type of services, guarantees, and other optimization objectives the PNO determines. MAC layer virtualizes its resource blocks and assigns vRBs to virtual MAC layers based on the service level agreement for that service group. In FIG. 1, as an example, three vMAC containers (20, 23, 26) are shown, each belonging to a separate service group. vMAC containers are unaware of each other and from their point of view, they are the sole user of the resource blocks. The enumeration of the vRBs (22, 25, 28 in FIG. 1) assigned to each vMAC can be overlapping (or the same). It is the MAC layer's responsibility to uniquely identify each vMAC container and distinguish between the vRBs of distinct vMACs that use the same ID space. Each vMAC is responsible for mapping the traffic flows of their subscribers onto the vRBs assigned to them by the MAC layer. The decisions taken in 21, 24, 27, and 11 determine which flow packets are assigned to which resource block and hence the wireless channels.

Figure 2:
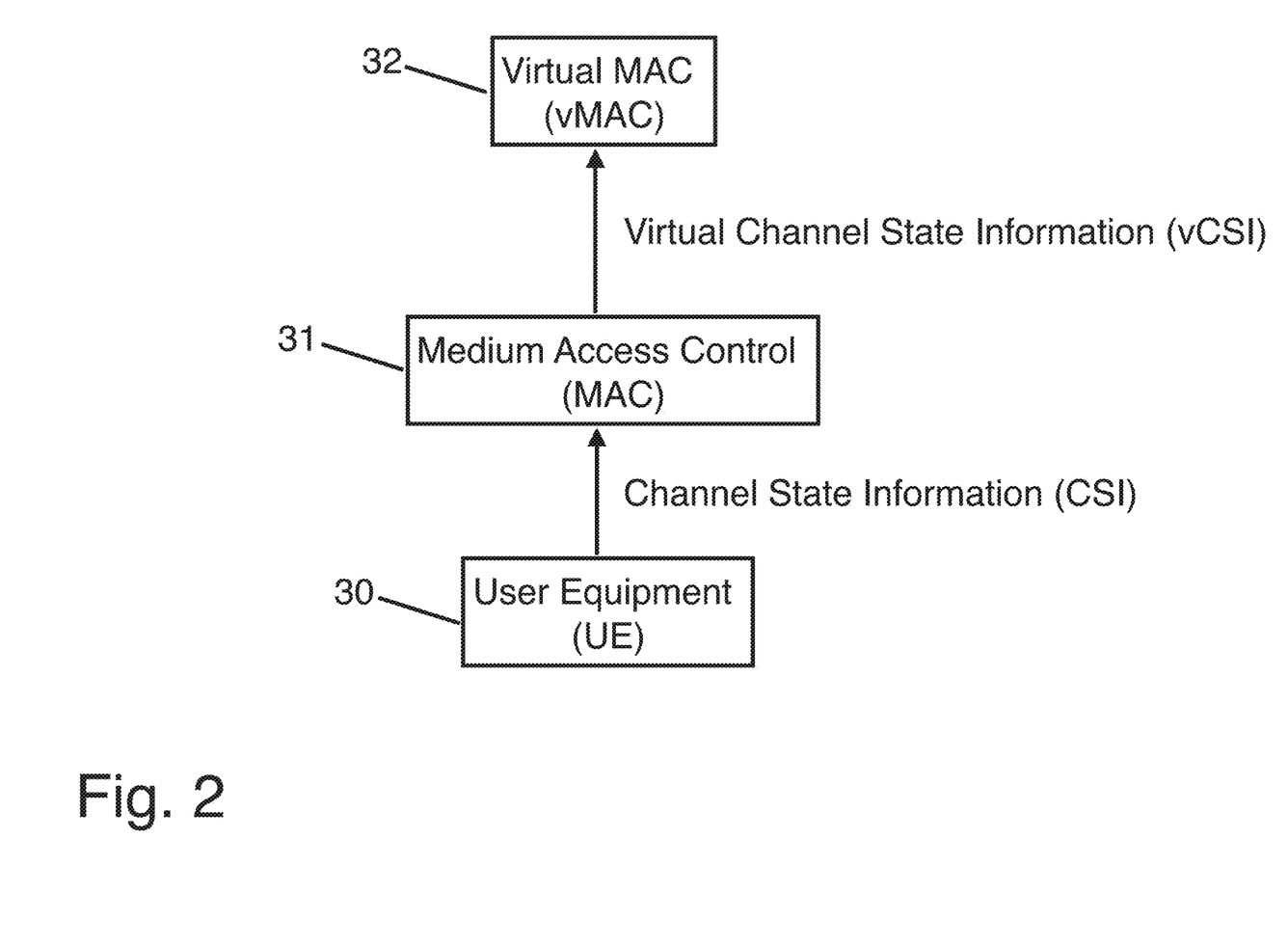
FIG. 2 depicts how Channel State Information (CSI) is feedback from UE to MAC layer, and then to an instance of a vMAC.

FIG. 2 depicts how Channel State Information (CSI) is feedback from UE (30) to MAC layer (31), and then to an instance of a vMAC (32). CSI feedback by UE may be for few channels (e.g., subband and time slots) and MAC layer typically interpolates these values to estimate the CSI for each resource block. MAC layer transforms CSI per UE and per RB into virtual CSI (vCSI) per UE and per vRB for each vMAC instance. vCSI along with the queue states of UEs and QoS classes of traffic flows determine how each vMAC make assignment decisions for their own traffic flows.

Figure 3A:
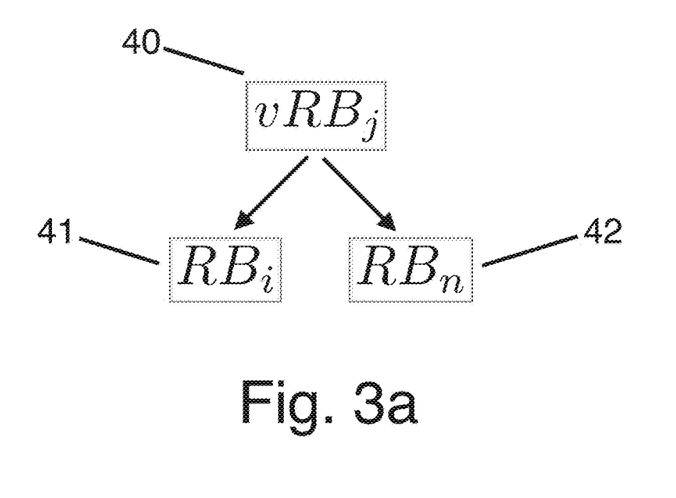
FIG. 3 shows one-to-many and many-to-one mapping allowed in the invention.
Figure 3B:
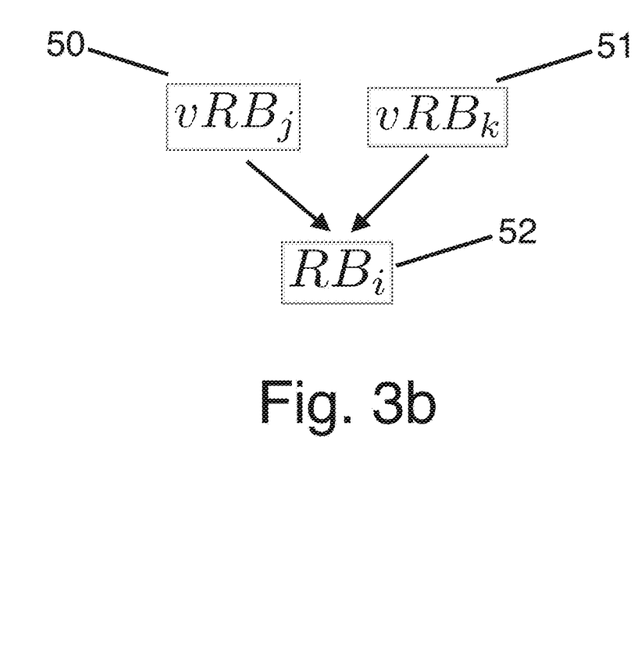

FIG. 3 shows one-to-many and many-to-one mapping allowed in the invention. FIG. 3a shows that a virtual resource block (40) is fragmented into two resource blocks (41 and 42) by the MAC layer of PNO. FIG. 3b shows that two virtual resource blocks (50 and 51) are multiplexed onto the same resource block by the MAC layer of PNO.

Figure 4:
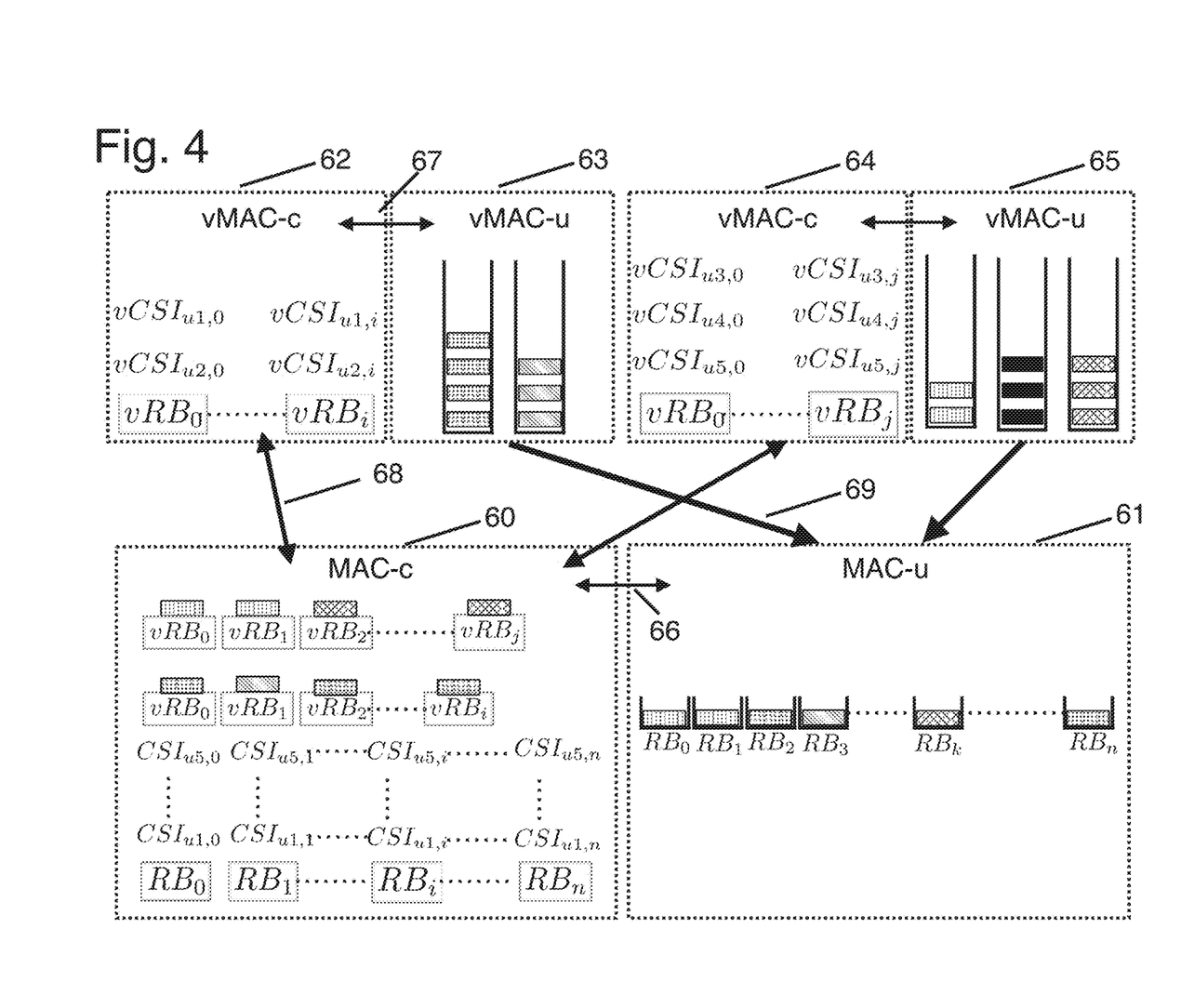

FIG. 4 illustrates an example of control plane and data/user plane split in the virtual MAC and physical MAC layers as well as the interfaces in between. Control plane of vMAC (vMAC-c) and user plane of vMAC (vMAC-u) together constitute the vMAC for a given MVNO. FIG. 4 shows two vMACs that belong to two MVNOs. The first vMAC is comprised of 62 and 63, the second vMAC is comprised of 64 and 65. Similarly, control plane of MAC (MAC-c) and user plane of MAC (MAC-u) constitute the MAC layer of PNO (60 and 61 in FIG. 4). vMAC-c has knowledge of vRBs assigned to its MVNO by the MAC-c. Each vRB has a list of per user channel state information. In FIG. 4, per user channel state information is shown as $vCSI_{u,j}$ representing the virtual CSI for user u for $vRB_j$. $vCSI_{u,j}$ is provided by MAC-c to each of vMAC-c. According to FIG. 4, the first vMAC has two active flows and the second vMAC has three active flows. vMAC-u performs the buffer management for these flows and share buffer state as well as flow information with vMAC-c through an internal interface (e.g., 67 in FIG. 4). Each vMAC-c performs flow to vRB assignment based on $vCSI_{u,j}$ and flow information and informs MAC-c about this assignment decision. MAC-c with the knowledge of flow assignment decisions to vRBs assigned to each vMAC and using the per resource block CSI information for each user ($CSI_{u,j}$), makes the final assignment of resource blocks to individual flows and communicate with an internal interface (66) to MAC-u. MAC-u then directly pulls the packets from each vMAC-u based on the assignment by MAC-c to fill the transmission buffers for each resource block.

Figure 5:
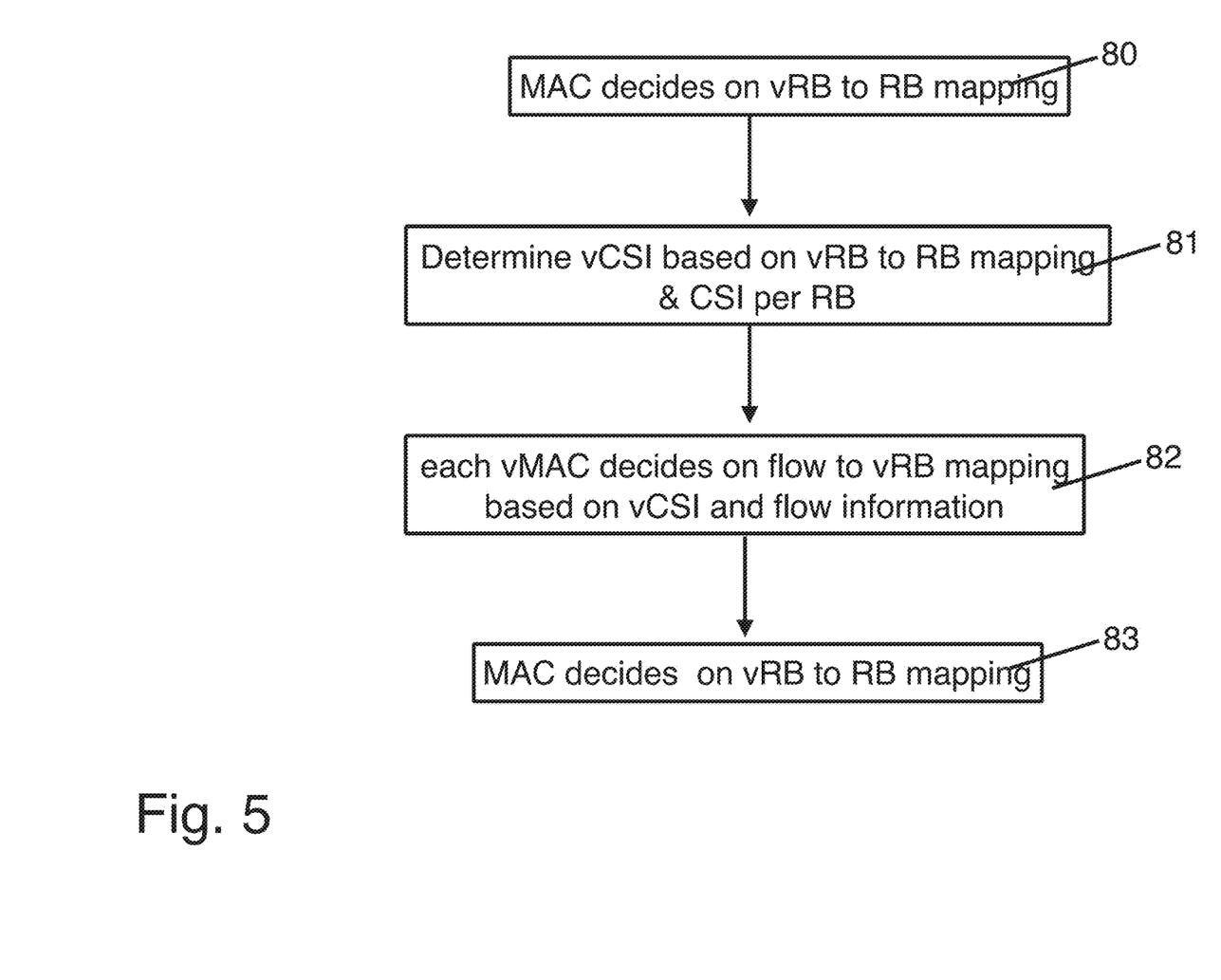
FIG. 5 illustrates the steps involved in vCSI generation and final flow to RB allocation in one common use of the method and apparatus depicted in FIG. 1 and FIG. 4.

FIG. 5 illustrates the steps involved in vCSI generation and final flow to RB allocation in one common use of the method and apparatus depicted in FIG. 1 and FIG. 4.

The typical embodiment of this invention provides, for each service group, the controlling network operator with a virtual MAC provides the full functionality of a physical MAC layer. Each vMAC (e.g., 20 in FIG. 1) has its own set of virtual resource blocks. These set of resource blocks are leased for a pre-specified time period or until they are released by the service group. In one embodiment, each vRB has a fixed cost per unit time (e.g., scheduling interval) throughout the leasing term. In another embodiment, each vRB has a variable cost as determined by the market value.

Each vMAC allocates its leased virtual resource blocks to its own traffic flows through a custom mapping function (e.g., mapper blocks 21, 24, and 27 in FIG. 1). In one embodiment, these custom mapping functions are dynamically downloaded from a remote server and can be modified/upgraded/replaced by the network operator controlling the service group. In another embodiment, several custom mapping functions can be preloaded onto the network node/server hosting the vMAC and controlling network operator can remotely configure its vMAC to choose one of these said mapping functions. How the resource blocks are assigned to each traffic flow as determined by these mapping functions can be simple policies such as round robin, weighted round robin, fixed allocation or can be more complex policies that depend on the channel state information of the subscribers of the controlling network operator, the number of virtual resource blocks currently leased for the service group, the long-term leasing budget, queue backlogs, flow priorities, flow capabilities, etc. Each vMAC is responsible for managing its memory allocation, while keeping the state information required performing the scheduling decisions. Flow mapper decides which flows are mapped onto which vRB (e.g., 22) in each scheduling interval (e.g., every 1 millisecond in LTE systems).

In the preferred embodiment, MAC layer of physical network operator (PNO) takes flow to vRB allocation decisions for each scheduling interval as an input from each vMAC. Based upon its own resource allocation objectives, MAC allocates actual RBs to each vRB, which in turn are mapped onto the physical channel resources by the physical layer of the radio access technology used by the PNO. In FIG. 1, an OFDMA based system is shown as an example where $RB_i$ corresponds to a well-defined set of sub-bands and number of OFDMA symbols. The vRB to RB Mapper (11 in FIG. 1) can target overall system efficiency and typically uses the CSI information of all users over all resource blocks to make the scheduling decisions. In a typical embodiment, all vRBs are assigned to at least one RB in each scheduling interval. In another embodiment, MAC layer oversubscribes the MVNOs and total number of vRBs leased to all MVNOs can be larger than the actual number of RBs. In that case, some vRBs may not be allocated to any RB at each scheduling interval. Based on the service level agreement, MAC layer may reimburse each MVNO in money amount or provide credit to the MVNO that can lease more vRBs for its vMAC instances in the same or different cell sites. In another embodiment, MAC layer can provide N vRBs to a vMAC instance, but also provides a constraint M≤N such that the said vMAC instance can at most select M vRBs in the subsequent scheduling interval. In this case M signifies the actual number of vRBs being leased for the service group and N provides additional degree of freedom to the vMAC instance. Yet, in another embodiment, vMAC instance make use of all N vRBs in its scheduling decision, but guaranteed by the MAC layer to accommodate only M of them. In one case, based on the service level agreement, the M accommodated allocations can be according to a vRB ordering provided by the vMAC instance. In another case, the MAC can arbitrarily pick M vRBs, for which RBs are actually allocated.

An important component of the invention is the concept of virtual Channel State Information (vCSI) that is provided by the MAC instance to vMAC instances. vCSI information is provided for each vRB that is assigned to a vMAC instance on a per subscriber/user basis (i.e., subscriber/user of the MVNO that owns the said vMAC instance). FIG. 2 shows a typical chain of feedback starting from user equipment (UE) up to vMAC instance. First, UE (30 in FIG. 2) sends its channel measurement results in the form of received signal strengths (from the serving cell as well as neighboring cells), channel quality indicator, precoding vector choices, etc., which are collectively referred to as channel state information (CSI). CSI information sent by UE is typically for a subset of RBs. In one embodiment, MAC layer (31 in FIG. 2) interpolates and extrapolates the missing CSI information for the remaining RBs for that UE. In another embodiment, MAC layer only uses the RBs with the known channel quality for making assignments to that UE. With or without the interpolation/extrapolation stage, MAC layer transforms the per user per RB CSI into per user per vRB CSI, referred to as virtual CSI (vCSI). These transformed values are communicated with the vMAC (32 in FIG. 2). vMAC may utilize the vCSI in mapping its flows to its vRBs. In one embodiment, vMAC layer does not receive vCSI for all vRBs it owns. In such cases, vMAC layer itself can use the received vCSI to interpolate/extrapolate missing vCSI. In another embodiment, vMAC layer makes resource allocation decisions only for the vRBs for which it has received vCSI.

One common mapping function from CSI to vCSI for a given user and RB is for the MAC layer first determine the vRB to RB mapping and then pass the CSI for a given RB itself as the vCSI for the vRB that is mapped onto the said RB (i.e., identity function is used for the transformation). In another common usage, MAC instance selectively attenuates or amplifies CSI in generating CSI for individual users and vRBs to force vMAC make resource allocation decisions that are more system efficient. In this latter usage, the preferred embodiment is to have the MAC layer to delay its vRB to RB mapping decision until each vMAC completes its flow to vRB allocation. Yet, in another embodiment, a MAC instance makes a first vRB to RB mapping decision (block 80 in FIG. 5), upon which vCSI is generated and passed onto the corresponding vMAC (block 81 in FIG. 5), upon which vMAC makes flow to vRB allocation (block 82 in FIG. 5), upon which the MAC instance makes a second vRB to RB mapping decision to finalize the flow to RB allocation (block 83 in FIG. 5).

The actual mapping from vRBs to RBs can be a mixture of three strategies. Some mappings are one to one, i.e., one and only one vRB is mapped onto a given RB. Some mappings are one to many, i.e., one vRB is fragmented and mapped onto two RBs (e.g., in FIG. 3a, 40 is split into 41 and 42). Some mappings are many to one, i.e., two vRBs are multiplexed together onto the same RB (e.g., 50 and 51 are multiplexed together onto 52). Multiplexing can be done across the flows going to the same UE regardless of these flows are served by the same or distinct vMACs. There can be also a hybrid scheme where some fragments of a vRB are multiplexed together with another (fragment or full) vRB.

The invention further divides MAC and vMAC instances into control and user plane functions. MAC instance is composed of MAC control (MAC-c) and MAC user (MAC-u) components (shown as 60 and 61 in FIG. 4, respectively). vMAC instance is similarly composed of vMAC control (vMAC-c) and vMAC user (MAC-u) components (e.g., 62 and 63 as well as 64 and 65 in FIG. 4). There is an internal interface between MAC-c and MAC-u not visible to other MAC or vMAC instances (66 in FIG. 4). This internal interface is used to gather transmission state of each RB and to instruct MAC-u from which flow buffer to fill a given RB transmission buffer, when RB is ready to accept new block. There is an internal interface between vMAC-c and vMAC-u of the same vMAC instance (67 in FIG. 4) not visible to other vMAC and MAC instances. This interface is used by vMAC-c to pull flow information and buffer states. There is another dedicated interface between each vMAC-c and MAC-c (68 in FIG. 4). This interface (68) is utilized by vMAC-c to retrieve leased vRBs and vCSI from MAC-c. Each vMAC-c makes resource block allocation decisions for their flows based on leased vRBs, vCSI, flow information, and buffer states for the next scheduling interval. The interface (68) is utilized by MAC-c to retrieve flow to vRB mapping decisions for the next scheduling interval. Using flow to vRB mapping information, per UE per RB CSI, and possible past allocation history in the form of penalties and credits per vMAC, MAC-c makes scheduling decisions on which flow to map onto which RB. This decision is communicated over interface (66) to MAC-u, which then retrieves blocks from corresponding vMAC-u instances over the interface (69) and fill the transmission buffers of RBs for the next scheduling interval.

In the most common usage scenario, vMAC is collocated (i.e., on the same network node or server) with the MAC. In another usage scenario, a plurality of vMACs is collocated with the MAC, while another plurality of vMACs runs on remote servers or network nodes. vMAC-c and vMAC-u of the same service group can be collocated. In another embodiment, vMAC-c and vMAC-u of the same MVNO run on physically separate locations.

In one embodiment, the present invention provides an article of manufacture comprising non-transitory computer storage medium storing computer readable program code which, when executed by a computer, implements medium access control (MAC) layer virtualization comprising: computer readable program code implementing a MAC layer, computer readable program code implementing a physical MAC layer, computer readable program code implementing a plurality of physical resource blocks (RBs) associated with the MAC layer, computer readable program code implementing a plurality of virtual medium access control (vMAC) layers, each vMAC layer corresponding to a separate service group, where each service group programs its own scheduling logic in each vMAC layer, computer readable program code implementing a plurality of virtual resource blocks (vRBs) associated with each vMAC layer, the vRBs filled with data packets according to the scheduling logic in each vMAC instance, wherein the physical MAC layer virtualizes the RBs as vRBs and assigns them to each vMAC layer according to a service level agreement associated with each service group, and each vMAC maps traffic flows of subscribers associated with it onto the assigned vRBs.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a method and apparatus for virtualized wireless scheduler. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:
1. A system comprising:
a processor;
storage storing computer readable programmable code, which when executed by the processor implements a communication architecture for medium access control (MAC) layer virtualization, said storage comprising computer readable program code to:
implement a physical MAC layer;
implement a plurality of physical resource blocks (RBs) associated with the MAC layer;
implement a plurality of independent virtual medium access control (vMAC) layers, each vMAC layer corresponding to a separate service group, where each service group programs its own scheduling logic in each vMAC layer;
implement a plurality of virtual resource blocks (vRBs) associated with each vMAC layer, the vRBs filled with data packets according to the scheduling logic in each vMAC instance,
the physical MAC layer virtualizing the RBs as vRBs and assigning them to each vMAC layer according to a service level agreement associated with each service group,
each vMAC mapping traffic flows of subscribers associated with it onto vRBs assigned to them by the physical MAC layer,
wherein the vRBs associated with a given vMAC are leased either for a pre-specified time period, or until they are released by the given vMAC's service group, and
wherein the given vMAC allocates its leased vRBs to its own traffic flows through a custom mapping function.
2. The system of claim 1, wherein the custom mapping function takes into account one or more optimization objectives selected from the following: type of services or type of guarantees.
3. The system of claim 1, wherein the custom mapping functions are dynamically downloaded from a remote server and can be modified, upgraded, or replaced by a network operator associated with one of the service groups.

4. The system of claim 1, wherein the custom mapping function is picked from a plurality of custom mapping functions that are preloaded onto a network node/server hosting one of the vMACs.

5. The system of claim 1, wherein each vRB has a fixed cost per unit time throughout the period of the lease.

6. The system of claim 1, wherein each vRB has a variable cost as determined by market value.

7. The system of claim 1, wherein channel state information (CSI) is received via a feedback from user equipment (UE) to the MAC layer, and then to an instance of vMAC, where the MAC layer transforms per UE per RB CSI into per UE virtual CSI (vCSI) for each vMAC instance and the vCSI, along with UE's queue states and quality of service (QoS) classes of traffic flows, determine how each vMAC makes assignment decisions for its own traffic flows.

8. The system of claim 1, wherein one of the following schemes is used in assigning vRBs: (a) all vRBs are assigned to at least one RB in each scheduling interval, (b) some vRBs are not allocated to any RB at each scheduling interval, (c) N vRBs are assigned to one vMAC instance along with a constraint M≤N such that the one vMAC instance can at most select M vRBs in a subsequent scheduling interval, where M signifies an actual number of vRBs being leased for a given service group and N provides additional degree of freedom to the one vMAC instance, or (d) a vMAC instance uses all of N vRBs in its scheduling decision, but is guaranteed by the MAC layer to accommodate only M of them, where M accommodated allocations are according to a vRB ordering provided by the vMAC instance or the MAC arbitrarily picks M vRBs, for which RBs are actually allocated.

9. The system of claim 1, wherein mapping of vRBs to RBs is based on one of the following strategies: (1) one-to-one mapping where one and only one vRB is mapped onto a given RB, (2) one-to-many where one vRB is fragmented and mapped onto two or more RBs, and (3) many-to-one where two vRBs are multiplexed together onto one RB.

10. The system of claim 1, wherein the MAC and the vMAC instances are each further divided into control and user plane functions.

11. An article of manufacture comprising non-transitory computer storage medium storing computer readable program code which, when executed by a computer, implements medium access control (MAC) layer virtualization comprising:
computer readable program code implementing a MAC layer;
computer readable program code implementing a physical MAC layer;
computer readable program code implementing a plurality of physical resource blocks (RBs) associated with the MAC layer;
computer readable program code implementing a plurality of independent virtual medium access control (vMAC) layers, each vMAC layer corresponding to a separate service group, where each service group programs its own scheduling logic in each vMAC layer;
computer readable program code implementing a plurality of virtual resource blocks (vRBs) associated with each vMAC layer, the vRBs filled with data packets according to the scheduling logic in each vMAC instance,
the physical MAC layer virtualizing the RBs as vRBs and assigning them to each vMAC layer according to a service level agreement associated with each service group,
each vMAC mapping traffic flows of subscribers associated with it onto vRBs assigned to them by the physical MAC layer,
wherein the vRBs associated with a given vMAC are leased either for a pre-specified time period, or until they are released by the given vMAC's service group, and
wherein the given vMAC allocates its leased vRBs to its own traffic flows through a custom mapping function.

12. The article of manufacture of claim 11, wherein the custom mapping function takes into account one or more optimization objectives selected from the following: type of services or type of guarantees.

13. The article of manufacture of claim 11, wherein the custom mapping functions are dynamically downloaded from a remote server and can be modified, upgraded, or replaced by a network operator associated with one of the service groups.

14. The article of manufacture of claim 11, wherein the custom mapping function is picked from a plurality of custom mapping functions that are preloaded onto a network node/server hosting one of the vMACs.

15. The article of manufacture of claim 11, wherein channel state information (CSI) is received via a feedback from user equipment (UE) to the MAC layer, and then to an instance of vMAC, where the MAC layer transforms per UE per RB CSI into per UE virtual CSI (vCSI) for each vMAC instance and the vCSI, along with UE's queue states and quality of service (QoS) classes of traffic flows, determine how each vMAC makes assignment decisions for its own traffic flows.

16. The article of manufacture of claim 11, wherein one of the following schemes is used in assigning vRBs: (a) all vRBs are assigned to at least one RB in each scheduling interval, (b) some vRBs are not allocated to any RB at each scheduling interval, (c) N vRBs are assigned to one vMAC instance along with a constraint M≤N such that the one vMAC instance can at most select M vRBs in a subsequent scheduling interval, where M signifies an actual number of vRBs being leased for a given service group and N provides additional degree of freedom to the one vMAC instance, or (d) a vMAC instance uses all of N vRBs in its scheduling decision, but is guaranteed by the MAC layer to accommodate only M of them, where M accommodated allocations are according to a vRB ordering provided by the vMAC instance or the MAC arbitrarily picks M vRBs, for which RBs are actually allocated.

17. The article of manufacture of claim 11, wherein mapping of vRBs to RBs is based on one of the following strategies: (1) one-to-one mapping where one and only one vRB is mapped onto a given RB, (2) one-to-many where one vRB is fragmented and mapped onto two or more RBs, and (3) many-to-one where two vRBs are multiplexed together onto one RB.

* * * * *